US008425747B2

(12) United States Patent
Schulte et al.

(10) Patent No.: US 8,425,747 B2
(45) Date of Patent: Apr. 23, 2013

(54) CATHODIC ELECTRODEPOSITION COATINGS CONTAINING POLYMETHYLENE UREA

(75) Inventors: Rolf Schulte, Havixbeck (DE); Hubert Baumgart, Münster (DE); Peter Averhage, Drensteinfurt (DE); Oliver Johannpoetter, Greven (DE)

(73) Assignee: BASF Coatings GmbH, Munster (DE)

( * ) Notice: Subject to any disclaimer, the term of this patent is extended or adjusted under 35 U.S.C. 154(b) by 246 days.

(21) Appl. No.: 12/934,761

(22) PCT Filed: Mar. 25, 2009

(86) PCT No.: PCT/EP2009/002185
§ 371 (c)(1),
(2), (4) Date: Nov. 5, 2010

(87) PCT Pub. No.: WO2009/118172
PCT Pub. Date: Oct. 1, 2009

(65) Prior Publication Data
US 2011/0048948 A1 Mar. 3, 2011

(30) Foreign Application Priority Data

Mar. 27, 2008 (DE) .......................... 10 2008 016 220

(51) Int. Cl.
*C25D 13/10* (2006.01)
*C08L 63/00* (2006.01)

(52) U.S. Cl.
USPC ........................... 204/489; 204/506; 523/415

(58) Field of Classification Search .................. 204/489, 204/506; 523/415
See application file for complete search history.

(56) References Cited

U.S. PATENT DOCUMENTS

| 3,922,253 | A | 11/1975 | Jerabek et al. |
|---|---|---|---|
| 4,458,054 | A | 7/1984 | Schmozer et al. |
| 4,711,937 | A | 12/1987 | Paar |
| 4,808,658 | A | 2/1989 | Walz et al. |
| 4,865,704 | A | 9/1989 | Saatweber et al. |
| 5,003,025 | A | 3/1991 | Dobbelstein et al. |
| 5,021,502 | A | 6/1991 | Patzschke et al. |
| 5,324,404 | A | 6/1994 | Ott et al. |
| 5,330,839 | A | 7/1994 | Yasuoka et al. |
| 5,554,700 | A | 9/1996 | Schipfer et al. |
| 5,670,441 | A | 9/1997 | Foedde et al. |
| 5,869,198 | A | 2/1999 | Erne et al. |
| 5,908,912 | A | 6/1999 | Kollah et al. |
| 6,274,649 | B1 | 8/2001 | Ott et al. |
| 6,887,360 | B2 * | 5/2005 | Retzlaff et al. ............... 204/489 |
| 7,211,182 | B2 * | 5/2007 | Lehmann et al. ............. 204/486 |

FOREIGN PATENT DOCUMENTS

| DE | 1907914 | | 10/1969 |
|---|---|---|---|
| DE | 1907914 | A1 | 10/1969 |
| DE | 3300570 | A1 | 7/1984 |
| DE | 3518732 | A1 | 11/1986 |
| DE | 3738220 | A1 | 5/1989 |
| DE | 4126476 | A1 | 2/1992 |
| DE | 69201259 | T2 | 6/1995 |
| DE | 4423139 | A1 | 1/1996 |
| DE | 4434593 | A1 | 4/1996 |
| DE | 19618379 | A1 | 11/1997 |
| DE | 19703869 | A1 | 8/1998 |
| DE | 10001222 | A1 | 8/2001 |
| DE | 10236350 | A1 | 2/2004 |
| DE | 102005057853 | A1 | 6/2007 |
| DE | 102007038824 | A1 | 2/2009 |
| EP | 0082291 | A1 | 6/1983 |
| EP | 0178531 | A1 | 4/1986 |
| EP | 0227975 | A1 | 7/1987 |
| EP | 0234395 | A2 | 9/1987 |
| EP | 0245786 | A2 | 11/1987 |
| EP | 0261385 | A2 | 3/1988 |
| EP | 0310971 | A2 | 4/1989 |
| EP | 0333327 | A1 | 9/1989 |
| EP | 0414199 | A2 | 2/1991 |
| EP | 0433783 | A1 | 6/1991 |
| EP | 0456270 | A1 | 11/1991 |
| EP | 0476514 | A1 | 3/1992 |
| EP | 0505445 | B1 | 9/1992 |
| EP | 0595186 | A1 | 5/1994 |
| EP | 0505445 | B1 | 11/1994 |
| EP | 0639660 | A1 | 2/1995 |
| EP | 0690106 | A1 | 1/1996 |
| EP | 0642558 | B2 | 9/1996 |
| EP | 0739389 | B1 | 5/1998 |
| EP | 0817684 | B1 | 3/1999 |
| EP | 0817684 | B1 | 11/1999 |
| EP | 0642558 | B2 | 10/2001 |
| EP | 0927232 | B1 | 1/2002 |
| EP | 0961797 | B1 | 4/2003 |
| EP | 1342757 | A1 | 9/2003 |
| EP | 1163302 | B1 | 4/2004 |
| EP | 1510558 | A1 | 3/2005 |
| EP | 1518906 | A1 | 3/2005 |
| GB | 1239143 | A | 7/1971 |
| GB | 2368302 | A | 5/2002 |
| WO | WO87/02717 | A1 | 5/1987 |
| WO | WO9402543 | A1 | 2/1994 |
| WO | WO9810024 | A1 | 3/1998 |
| WO | WO98/33835 | A1 | 8/1998 |
| WO | WO98/43684 | A1 | 10/1998 |
| WO | WO01/51570 | A1 | 7/2001 |

OTHER PUBLICATIONS

International Preliminary Report on Patentability for International application No. PCT/EP2009/002185 dated Oct. 5, 2010.

(Continued)

*Primary Examiner* — Kishor Mayekar
(74) *Attorney, Agent, or Firm* — Cantor Colburn LLP

(57) ABSTRACT

Disclosed is cathodic electrodeposition coating comprising at least one binder, at least one crosslinking agent, at least one bismuth compound comprising a basic bismuth nitrate, and a polymethylene urea. In one embodiment, the basic bismuth nitrate compound comprises a bismuth subnitrate of the empirical formula $4(BiNO_3(OH)_2)BiO(OH)$.

19 Claims, No Drawings

OTHER PUBLICATIONS

International Search Report for International application No. PCT/EP2009/002185 dated Aug. 5, 2009.
Written Opinion for International application No. PCT/EP2009/002185.
HEK GmbH, "Bismuth Subntrate (light and heavy)", Technical Data Sheet, MCP HEC—GmbH Div. Metals & Chemicals, Jan. 3, 2007, Lubeck, Germany, 2 pages.
English Translation of International Preliminary Report on Patentability for International application No. PCT/EP2008/006642 issued Mar. 2, 2010.
International Search Report for International Application No. PCT/EP2008/006642 mailed Sep. 17, 2009.
English Translation of Written Opinion for International Application No. PCT/EP2008/006642 mailed Sep. 17, 2009.

* cited by examiner

CATHODIC ELECTRODEPOSITION COATINGS CONTAINING POLYMETHYLENE UREA

CROSS REFERENCE TO RELATED APPLICATIONS

This application is a National Phase Application of Patent Application PCT/EP2009/002185 filed on 25 Mar. 2009, which claims priority to DE 10 2008 016 220.5, filed 27 Mar. 2008, both of which are hereby incorporated by reference in their entirety.

FIELD OF THE INVENTION

The invention relates to a cathodically depositable electrodeposition primer comprising at least one binder, at least one crosslinking agent, and at least one bismuth compound, to a process for preparing this electrodeposition primer, and to its use.

BACKGROUND OF THE INVENTION

There are numerous examples known from the patent literature of the preparation of electrodeposition primers. Compounds of tin- and/or of bismuth, more particularly, are employed as crosslinking catalysts in these materials. In recent times the bismuth compounds have been used preferentially as crosslinking catalysts, since in addition to their high activity they also possess a low toxicity as compared with the tin compounds. The use of bismuth compounds as catalysts in the formation of urethane structures from isocyanate groups and hydroxyl groups is already well established (J. H. Saunders and K. C. Frisch, Polyurethanes, Chemistry and Technology, from High Polymers, Vol. XVI, Part 1, Interscience Publishers, a division of John Wiley and Sons, New York, 4th Printing, July 1967, page 167). To date, however, the use of bismuth compounds as catalysts in connection with the preparation of electrodeposition primers has been very limited. In EP 0 642 558 the bismuth compounds that are candidates for the use of electrodeposition primers are significantly restricted, since the readily available salts of relatively long-chain acids cause disruptions as a result of oily exudations when used in cationic binders. Furthermore, as a result of being mixed into the binder or into a pigment paste, inorganic bismuth compounds are said to be difficult to disperse and in this form to have only a low catalytic activity. German patent application DE 102 36 350 A1 describes electrodeposition primers comprising bismuth subsalicylate which exhibit good leveling, are free from surface defects, and ensure effective corrosion control. These known electrodeposition primers, however, require a relatively high baking temperature in order to achieve sufficient crosslinking. In the as yet unpublished patent application DE 10 2007 038 824 A1, electrodeposition primers are described that comprise basic bismuth nitrate. As a result of this it is possible for the crosslinking reactions to take place at lower baking temperatures.

European application EP 0 433 783 A1 describes aqueous electrocoats which comprise dispersed polymer particles. These polymer particles include urea-aldehyde resins, which form crosslinked, infusible masses. WO 98/33835 discloses cathodically depositable electrodeposition primers which comprise amino resin crosslinking agents such as alkylated urea-formaldehyde resins. The electrodeposition primers claimed in WO 87/02717 may likewise comprise crosslinking agents such as alkylated urea-formaldehyde resins.

The films of the electrodeposition primers known in the prior art, however, do not have uniform, homogeneous surfaces and do not possess properties of elasticity at low baking temperatures.

It is an object of the present invention to provide a new electrodeposition primer with which the crosslinking reactions ought to take place at very low baking temperatures. At the same time the film of the electrodeposition primer ought to have a uniform and homogeneous surface, even in critical edge regions. Moreover, the film ought to possess properties of elasticity.

SUMMARY OF THE INVENTION

Surprisingly it has been found that the object can be achieved through the combination of polymethyleneurea with basic bismuth nitrate as crosslinking catalyst. The films deposited on the substrate can be baked at relatively low temperatures. The film has a uniform and homogeneous surface, even in critical edge regions, and possesses properties of elasticity.

The invention accordingly provides an electrodeposition primer of the type specified at the outset comprising a basic bismuth nitrate as bismuth compound and polymethyleneurea as a further component.

The invention accordingly comprises a cathodically depositable electrodeposition primer comprising at least one binder, at least one crosslinking agent, and at least one bismuth compound, comprising a basic bismuth nitrate as bismuth compound and polymethyleneurea as a further component.

In the light of the prior art it was surprising and unforeseeable for the skilled worker that the object on which the invention is based could be achieved by means of the combination of basic bismuth nitrate and polymethyleneurea. A particular surprise was that the electrodeposition primers of the invention were easy to prepare, were stable on storage, exhibited an optimum particle size in respect of the dispersed constituents, and had very good filterability. They were easy to deposit without problems, electrophoretically, on electrically conductive substrates. The resulting electrocoats had good flow, were free from surface defects and specks, and afforded outstanding corrosion control and edge protection.

DETAILED DESCRIPTION OF AN EMBODIMENT OF THE INVENTION

Polymethyleneurea (PMH) and its preparation are well established. For example, acid-catalyzed gelling of a urea-formaldehyde solution or of a water-dilutable urea-formaldehyde concentrate can be used to obtain PMH (described, for example, in Renner, Makromolekulare Chemie, 1971, 1, 149). Furthermore, for example, the German Laid-Open specification DE 19 07 914 describes the preparation of finely divided amino resin solids on the basis of urea-formaldehyde condensates by acid-catalyzed polycondensation in an aqueous medium.

PMH finds application, for example, as a free-flowing substance in absorbent articles (WO 98/43684). The preparation process described therein produces, in a first reaction of urea and formaldehyde, and as a function of the stoichiometric ratio, either monomethylolurea or dimethylolurea. Under appropriate reaction conditions (for example, basic pH, temperature between 50° C. and 100° C.) the products of the reaction undergo reaction with elimination of water to give a precondensate. The precondensate is subsequently crosslinked by means of acid catalysis to form PMH. PMH in this case may also have a PMH fraction which carries ether groups.

The electrodeposition primer of the invention comprises at least one polymethyleneurea. PMH may be considered, for example, to be methylenediaminomethyl ether polycondensate. Compounds of this kind are sold, for example, by DEUTERON GmbH, Germany, under the name Deuteron®, as matting agents for aqueous and solventborne coating systems. PMH may contain methylol, methylol ether and/or ether groups. Preferably PMH contains no ether groups. Polymethyleneurea preferably contains 0.2% to 3.0% by mass of methylol and/or methylol ether groups, based on the total mass of the polymethyleneurea. Particularly preferred are 0.5 to 2.0% by mass.

The electrodeposition primers of the invention contain preferably 0.01% to 2.0% by mass of polymethyleneurea, based on the total mass of the electrodeposition primer. Preference is given to 0.05% to 1.0% by mass, particular preference to 0.05% to 0.2% by mass.

The electrodeposition primers of the invention preferably have a solids content of 5% to 50%, more preferably 5% to 35% by mass. This solids content is the fraction of an electrodeposition primer that builds the electrocoat produced from said material. The electrodeposition primers of the invention comprise at least one binder.

The binders contain reactive functional groups which are able to enter into thermal crosslinking reactions with complementary reactive functional groups that are present in crosslinking agents.

Examples of suitable reactive functional groups are hydroxyl groups, thiol groups, and primary and secondary amino groups, more particularly hydroxyl groups.

The binder may contain cationic and/or potentially cationic groups. Binders of this kind are used in cathodically depositable electrodeposition primers.

Examples of suitable potentially cationic groups which can be converted into cations by neutralizing agents and/or quaternizing agents are primary, secondary or tertiary amino groups, secondary sulfide groups or tertiary phosphine groups, more particularly tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium groups or tertiary sulfonium groups, but more particularly quaternary ammonium groups.

Examples of suitable neutralizing agents for the potentially cationic groups are organic and inorganic acids such as sulfuric acid, hydrochloric acid, phosphoric acid, formic acid, acetic acid, lactic acid, dimethylolpropionic acid, citric acid or sulfonic acids, such as amidosulfonic acids and alkanesulfonic acids, such as methanesulfonic acid, for example, more particularly formic acid, acetic acid or lactic acid.

Examples of suitable binders for electrodeposition primers are known from the publications EP 0 082 291 A 1, EP 0 234 395 A 1, EP 0 227 975 A 1, EP 0 178 531 A 1, EP 0 333 327, EP 0 310 971 A 1, EP 0 456 270 A 1, U.S. Pat. No. 3,922,253 A, EP 0 261 385 A1, EP 0 245 786 A1, EP 0 414 199 A1, EP 0 476 514 A 1, EP 0 817 684 A 1, EP 0 639 660A 1, EP 0 595 186 A 1, DE 41 26 476 A 1, WO 98/33835, DE 33 00 570 A 1, DE 37 38 220 A 1, DE 35 18 732 A 1 or DE 196 18 379 A 1. These are preferably resins which contain primary, secondary, tertiary or quaternary amino or ammonium groups and/or tertiary sulfonium groups and have amine numbers preferably of between 20 and 250 mg KOH/g and a weight-average molecular weight of 300 to 10 000 daltons. Use is made more particularly of amino (meth)acrylate resins, amino-epoxy resins, amino-epoxy resins with terminal double bonds, amino-epoxy resins with primary and/or secondary hydroxyl groups, amino-polyurethane resins, amino-containing polybutadiene resins or modified epoxy resin/carbon dioxide/amine reaction products.

Suitable crosslinking agents include all typical and known crosslinking agents which contain suitable complementary reactive functional groups. The crosslinking agents are preferably selected from the group consisting of blocked polyisocyanates, melamine-formaldehyde resins, tris(alkoxycarbonylamino)triazines, and polyepoxides. The crosslinking agents are more preferably selected from the group consisting of blocked polyisocyanates and highly reactive melamine-formaldehyde resins. Particular preference is given to using the blocked polyisocyanates.

The blocked polyisocyanates are prepared from typical and known paint polyisocyanates having aliphatically, cycloaliphatically, araliphatically and/or aromatically attached isocyanate groups.

Examples of suitable paint polyisocyanates are described for example in "Methoden der organischen Chemie", Houben-Weyl, volume 14/2, 4th edition, Georg Thieme Verlag, Stuttgart 1963, pages 61 to 70, and by W. Siefken, Liebigs Annalen der Chemie, volume 562, pages 75 to 136.

Further examples of suitable paint polyisocyanates are polyisocyanates which contain isocyanurate, biuret, allophanate, iminooxadiazinedione, urethane, urea, carbodiimide and/or uretdione groups and which are obtainable from typical and known diisocyanates. Diisocyanates used with preference are hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane (BIC), diisocyanates derived from dimer fatty acids, 1,8-diisocyanato-4-isocyanatomethyloctane, 1,7-diisocyanato-4-isocyanatomethylheptane, 1-isocyanato-2-(3-isocyanatopropyl)cyclohexane, 2,4- and/or 2,6-tolylene diisocyanate, 4,4'-diphenylmethane diisocyanate, naphthalene diisocyanate or mixtures of these polyisocyanates.

Examples of suitable blocking agents for preparing the blocked polyisocyanates are i) phenols, such as phenol, cresol, xylenol, nitrophenol, chlorophenol, ethylphenol, t-butylphenol, hydroxybenzoic acid, esters of this acid or 2,5-ditert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylol melamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;
vii) imides such as succinimide, phthalimide or maleinimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, imidazoles or triazoles; and also
xvii) 1,2-polyols such as ethylene glycol, propylene glycol, 1,2-butanediol;
xviii) 2-hydroxy esters such as 2-hydroxyethyl acrylate, 2-hydroxyethyl methacrylate;
xix) mixtures of these blocking agents.

The electrodeposition primers of the invention comprise bismuth subnitrate of the empirical formula $4(BiNO_3(OH)_2) \cdot BiO(OH)$. According to the German pharmacopeia (DAB) 7 it has a bismuth content of 71 to 74% by mass. The bismuth subnitrate is a commercial compound and is sold, for example, by MCP HEK GmbH, Lübeck, Germany. The electrodeposition primers of the invention, based on their solids, contain preferably 0.05% to 5%, more preferably 0.1% to 4%, and more particularly 0.2% to 3% by mass of bismuth subnitrate.

The electrodeposition primers of the invention may further comprise at least one typical and known additive, selected from the group consisting of catalysts other than bismuth subnitrate, pigments, anticrater additives, polyvinyl alcohols, thermally curable reactive diluents, molecularly dispersely soluble dyes, light stabilizers, such as UV absorbers and reversible free-radical scavengers (HALS), antioxidants, low-boiling and high-boiling ("long") organic solvents, devolatilizers, wetting agents, emulsifiers, slip additives, polymerization inhibitors, thermolabile free-radical initiators, adhesion promoters, flow control agents, film-forming assistants, wetting and dispersing agents, fillers, flame retardants, corrosion inhibitors, free-flow aids, waxes, siccatives, biocides, and matting agents, in effective amounts.

Further examples of suitable additives are described in the textbook "Lackadditive" [Additives for coatings] by Johan Bieleman, Wiley-VCH, Weinheim, N.Y., 1998, in D. Stoye and W. Freitag (Editors), "Paints, Coatings and Solvents", Second, Completely Revised Edition, Wiley-VCH, Weinheim, N.Y., 1998, "14.9. Solvent Groups", pages 327 to 373.

Pigments are preferred additives employed. Preferably the pigments are selected from the group consisting of typical and known coloring, effect, electrically conductive, magnetically shielding, fluorescent, extending, and corrosion-inhibiting organic and inorganic pigments.

The electrodeposition primers of the invention are prepared by mixing binder, crosslinking agent, the basic bismuth nitrate compound, any other preferred constituents, and polymethyleneurea. The constituents can be homogenized. If appropriate, the electrodeposition primers of the invention can be prepared with the aid of typical and known mixing techniques and apparatus such as stirred tanks, agitator mills, extruders, compounders, Ultraturrax devices, in-line dissolvers, static mixers, micromixers, toothed-wheel dispersers, pressure release nozzles and/or microfluidizers. In this case PMH is incorporated preferably in the form of pigment pastes or pigment preparations into the electrodeposition primers (cf. Römpp Lexikon Lacke and Druckfarben, Georg Thieme Verlag, Stuttgart, N.Y., 1998, "Pigment preparations", page 452).

The electrodeposition primers of the invention may be used, for example, for cathodic dip coating. Cathodic deposition from the electrodeposition primers of the invention may be carried out typically on electrically conductive substrates, examples being substrates which are electrically conductive or have been made conductive, specific examples being plastic substrates which have been made electrically conductive by metallization, or, more particularly, on metallic substrates. The invention hence also provides the method of cathodic deposition of the electrodeposition primers of the invention on such substrates. Furthermore, the electrodeposition primers of the invention can be used to produce primer coats by cathodic dip coating of substrates having electrically conductive surfaces. Metallic substrates which can be used are parts of all typical metals, examples being the metal parts that are typical in the automobile industry, more particularly automobile bodies and their parts. The electrodeposition primers of the invention can also be used, accordingly, in the finishing of motor vehicles or parts thereof.

The invention is illustrated below with reference to examples.

EXAMPLES

Preparation Example 1

Crosslinker

The crosslinker from EP 0961797 B1 is used (page 6 lines 43-52). A reactor equipped with a stirrer, reflux condenser, internal thermometer, and inert gas inlet is charged with 1084 g of isomers and higher polyfunctional oligomers based on 4,4"-diphenylmethane diisocyanate, with an NCO equivalent weight of 135 (BasonatR A270, BASF; NCO functionality approximately 2.7; 2,2'- and 2,4'-diphenylmethane diisocyanate content below 5%) under a nitrogen atmosphere. 2 g of dibutyltin laurate are added and 1314 g of butyl diglycol are added dropwise at a rate such that the product temperature remains below 70° C. It may be necessary to cool the mixture. After the end of the addition the temperature is held at 70° C. for a further 120 minutes. When a check is subsequently made, NCO groups are no longer detectable. The mixture is cooled to 65° C. The solids content is >97% (1 hour at 130° C.).

Preparation Example 2

Binder Dispersion

The binder dispersion A from EP 0961797 B1 is used (page 7 lines 4-30). A laboratory reactor heated with heat transfer oil and equipped with stirrer, reflux condenser, thermometer, and inert gas inlet tube is charged with 1128 parts of a commercial epoxy resin based on bisphenol A with an epoxide equivalent weight (EEW) of 188; 262 parts of dodecylphenol, 31.4 parts of xylene, and 228 parts of bisphenol A, and this initial charge is heated at 127° C. under nitrogen. With stirring, 1.6 g of triphenylphosphine are added, whereupon there is an exothermic reaction and the temperature climbs to 160° C. The temperature is allowed to drop again to 130° C., after which the epoxide content is checked. The EEW of 532 indicates that >98% of the phenolic OH groups have undergone reaction. Then 297.5 parts of Pluriol P 900 (polypropylene glycol MW 900, BASF) are added with simultaneous cooling. 5 minutes later, with further cooling, 105 parts of diethanolamine are added at 120° C. When, after a brief exotherm ($T_{max}$ 127° C.), the temperature has dropped to 110° C. (30 minutes), 51 parts of N,N-dimethylaminopropylamine are added. After a brief exotherm ($T_{max}$ 140° C.) the batch is allowed to continue reaction at 130° C. for 2 hours, until the viscosity remains constant (1.8 dPas, cone-and-plate viscometer at 23° C., 40% in Solvenon PM (BASF)). Then, with simultaneous cooling, 58.5 parts of butyl glycol and 887.8 parts of the crosslinker (preparation example 1) are added, and the product is discharged at 105° C.

2100 parts of the mixture, which is still hot, are dispersed immediately with intense stirring in an initial charge consisting of a mixture of 1945 parts of demineralized water and 33.1 parts of glacial acetic acid. Following brief homogenization, dilution takes place with a further 1404 parts of demineralized water, and the dispersion is filtered through a K900 plate filter (Seitz). The characteristics of the dispersion are as follows:
Solids (1 h at 130° C.): 35.7%
MEQ base=0.657 meq/g resin solids
MEQ acid=0.283 meq/g resin solids
pH=5.4
Average particle size=1250 Å (light scattering method)
Sedimentation stability=no sediment after 3 months' storage at room temperature
Viscosity=14 sec. (DIN4 cup at 23° C.)

Preparation Example 3

Grinding Resin

The grinding resin A from EP 0961797 is used (page 9 lines 17-21). A reactor equipped with agitator, internal thermometer, nitrogen inlet, and water separator with reflux condenser is charged with 30.29 parts of an epoxy resin based on bisphenol A with an epoxide equivalent weight (EEW) of 188; 9.18 parts of bisphenol A, 7.04 parts of dodecylphenol, and 2.37 parts of butyl glycol. This initial charge is heated to 110° C., 1.85 parts of xylene are added, and the xylene is distilled off again under a gentle vacuum together with possible traces of water. Then 0.07 part of triphenylphosphine is added and the mixture is heated to 130° C. After an exotherm to 150° C., reaction is allowed to continue at 130° C. for a further hour. At that point the EEW of the reaction mixture is 860. The mixture is cooled, in the course of which 9.91 parts of butyl glycol and 17.88 parts of a polypropylene glycol diglycidyl ether with an EEW of 333 (DER 732, Dow Chemicals) are added. At 90° C. 4.23 parts of 2-2'-aminoethoxyethanol ($H_2N$—$CH_2$—$CH_2$—O—$CH_2$—$CH_2$—OH) and, 10 minutes later, 1.37 parts of N,N-dimethylaminopropylamine are added. After a brief exotherm the reaction mixture is held at 90° C. for 2 hours, until the viscosity remains constant, and is then diluted with 17.66 parts of butyl glycol. The resin has a solids of 69.8% (measured for 1 hour at 130° C.) and a viscosity of 5.5 dPas (measured using a cone-and-plate viscometer at 23° C. on a resin solution diluted to 40% with propylene glycol monomethyl ether (Solvenon PM, BASF). For greater ease of handling, the resin is additionally neutralized and diluted with 2.82 parts of glacial acetic acid and 13.84 parts of demineralized water. This lowers the original solids content to 60%.

Preparation Example 4

Aqueous Pigment Pastes

In a manner similar to the method described in EP 0505445 B1 (page 10 lines 35-42), the starting materials set out in table 1 below are used to prepare aqueous pigment pastes. For that purpose, first of all deionized water and the grinding resin from preparation example 3 are premixed. Then the remaining constituents, in the amounts indicated in table 1, are added and the composition is mixed for 30 minutes in a high-speed dissolver agitator. Subsequently the mixture is dispersed to a Hegmann fineness of less than 12 in a small laboratory mill for 1 to 1.5 hours. The amounts indicated are to be understood as weight fractions.

TABLE 1

Composition of the aqueous pigment pastes

| | Version A | Version B | Version C | Version D |
|---|---|---|---|---|
| Grinding resin A (preparation example 3) | 40 | 40 | 40 | 40 |
| Demineralized water | 8 | 8.5 | 9.4 | 9.8 |
| Bismuth subsalicylate | 6 | | | |
| Bismuth subnitrate | | 6 | 6 | 6 |
| Carbon black | 0.5 | 0.5 | 0.5 | 0.5 |
| Aluminum silicate | 8 | 8 | 8 | 8 |
| Titanium dioxide* | 37.5 | 35.2 | 33.1 | 31.7 |
| Deuteron MK-F6** | | 1.8 | 3 | 4 |

*TI-PURE R900, DuPont
**Polyurea, Deuteron

Examples B, C, D and Comparative Example A

Inventive and Conventional Cathodic Electrodeposition Primers

To prepare a conventional electrodeposition primer and the cathodic electrodeposition primers of the invention, the binder dispersion from preparation example 2 is combined with one of the aqueous pigment pastes listed in table 1 (preparation example 4) and with demineralized water in the amounts indicated in table 2 (weight fractions). The procedure is that the binder dispersion is introduced initially and diluted with demineralized water. Thereafter the pigment paste is introduced with stirring. This results in the inventive electrodeposition primers (versions B-D) and also a conventional electrodeposition primer A.

TABLE 2

Inventive and conventional electrodeposition primers

| Batch formula | Version A | Version B | Version C | Version D |
|---|---|---|---|---|
| Binder dispersion (preparation example 2) | 425.4 | 451.8 | 479.0 | 492.4 |
| Pigment paste (preparation example 4) | 69.8 | 56.1 | 42.3 | 35.1 |
| Demineralized water | 504.8 | 492.0 | 478.7 | 472.6 |

Testing for Mechanical Properties

The electrodeposition primers are aged at room temperature with stirring for 3 days before being used for cathodic electrodeposition priming. The coating films are deposited over 2 minutes with a deposition voltage of 220 volts and a breakthrough voltage of 350 volts (bath temperature of 29° C.) onto cathodically connected, zinc-phosphatized steel test panels without a Cr(IV) rinse in the pretreatment process. The deposited films are rinsed with deionized water and baked at 175° C. (panel temperature) for 15 minutes (coat thickness 20 μm).

TABLE 3

Mechanical properties

| Mechanical properties | | Version A | Version B | Version C | Version D |
|---|---|---|---|---|---|
| Bending on a conical mandrel, ISO method (cm) | 0 = good | 2 | 0 | 0 | 0 |
| Impact strength: reverse impact test (inch × pound) | 160 = good | 90 | 160 | 180 | 180 |
| Erichsen cupping, ISO method (mm) | 8 = good | 5 | 7 | 8 | 8 |

The mechanical properties of the coatings resulting from the electrodeposition primers of the invention are summarized in table 3 in comparison to those of a coating resulting from a conventional electrodeposition primer. The electrodeposition primers of the invention, accordingly, afford coatings having outstanding mechanical properties as compared with a conventional electrodeposition primer.

What is claimed is:

1. A cathodic electrodeposition coating comprising at least one binder, at least one crosslinking agent, at least one bismuth compound comprising a basic bismuth nitrate compound, and a polymethylene urea.

2. The electrodeposition coating of claim 1, wherein the polymethylene urea comprises at least one of a methylol group, a methylol ether group, an ether group, and combinations of two or more of the foregoing.

3. The electrodeposition coating of claim 1, wherein the polymethylene urea contains from 0.2% to 3.0% by mass of at least one of a methylol group, a methylol ether group, and a combination thereof, based on the total mass of the polymethylene urea.

4. The electrodeposition coating of claim 1, comprising from 0.01% to 2.0% by mass of polymethylene urea, based on the total mass of the coating.

5. The electrodeposition coating of claim 4, comprising from 0.05% to 1.0% by mass of polymethylene urea, based on the total mass of the coating.

6. The electrodeposition coating of claim 5, comprising from 0.05% to 0.2% by mass of polymethylene urea, based on the total mass of the coating.

7. The electrodeposition coating of claim 1, wherein the basic bismuth nitrate compound comprises a bismuth content of from 71% by mass to 74% by mass.

8. The electrodeposition coating of claim 1, wherein the basic bismuth nitrate compound comprises a bismuth subnitrate of the empirical formula $4(BiNO_3(OH)_2)BiO(OH)$.

9. The electrodeposition coating of claim 1, containing 0.05% to 5% by mass of the basic bismuth nitrate compound, based on the solids content.

10. The electrodeposition coating of claim 1, wherein the binder comprises cationic and/or potentially cationic groups.

11. The electrodeposition coating of claim 1, wherein the crosslinking agent is selected from the group consisting of blocked polyisocyanates, melamine-formaldehyde resins, tris(alkoxycarbonylamino)-triazines, and polyepoxides.

12. The electrodeposition coating of claim 1, further comprising at least one additive.

13. A process for preparing the electrodeposition coating of claim 1, comprising
mixing the binder, the crosslinking agent, the basic bismuth nitrate compound, and all further constituents with the polymethylene urea.

14. A process of applying an electrodeposition coating, comprising applying the electrodeposition coating of claim 1 to a substrate via a cathodic dip coating process.

15. The process of claim 14 wherein the substrate comprises an electrically conductive surface.

16. The process of claim 15 wherein the substrate comprises one or more parts of a motor vehicle.

17. A cathodic electrodeposition coating comprising at least one binder, at least one crosslinking agent, at least one bismuth compound comprising a basic bismuth nitrate compound, and a polymethylene urea, the basic bismuth nitrate compound comprising a bismuth subnitrate of the empirical formula $4(BiNO_3(OH)_2)BiO(OH)$ and the polymethylene urea comprising methylenediaminomethyl ether polycondensate.

18. A cathodic electrodeposition coating comprising at least one binder, at least one crosslinking agent, at least one bismuth compound comprising a basic bismuth nitrate compound, a polymethylene urea, carbon black and titanium dioxide, the basic bismuth nitrate compound comprising a bismuth subnitrate of the empirical formula $4(BiNO_3(OH)_2)BiO(OH)$.

19. A cathodic electrodeposition coating comprising at least one binder, at least one crosslinking agent, at least one bismuth compound comprising a basic bismuth nitrate compound, a polymethylene urea, carbon black, titanium dioxide and aluminum silicate, the basic bismuth nitrate compound comprising a bismuth subnitrate of the empirical formula $4(BiNO_3(OH)_2)BiO(OH)$.

* * * * *